United States Patent

[11] 3,543,963

| [72] | Inventors | Jerome S. Heisler;<br>Anthony J. Starr, Wilmington; John D. Carey, Sr., New Castle, Delaware |
|---|---|---|
| [21] | Appl. No. | 750,410 |
| [22] | Filed | July 5, 1968 |
| [45] | Patented | Dec. 1, 1970 |
| [73] | Assignee | Container Corporation of America<br>Chicago, Illinois<br>a corporation of Delaware |

[54] PLASTIC CONTAINER AND A METHOD OF MAKING SAME
1 Claim, 13 Drawing Figs.

[52] U.S. Cl. .................................................. 220/67, 220/72
[51] Int. Cl. ..................................................... B65d 7/42
[50] Field of Search .......................................... 220/67, 66, 72, (Plastics)

[56] References Cited
UNITED STATES PATENTS

| 2,487,400 | 11/1949 | Tupper | 150/.5 |
| 2,541,371 | 2/1951 | Kops | 220/66X |
| 2,588,604 | 3/1952 | Archer | 18/59 |
| 2,606,586 | 8/1952 | Hill | 150/.5 |
| 2,787,397 | 4/1957 | Radford | 220/72X |
| 2,894,844 | 7/1959 | Shakman | 220/Plastic |
| 2,918,003 | 12/1959 | Temple | 220/67X |
| 3,349,952 | 10/1967 | Bijvoet | 220/73X |
| 3,369,694 | 2/1968 | Mauser et al. | 220/67 |
| 3,397,815 | 8/1968 | Tench et al. | 220/67 |
| 3,424,343 | 1/1969 | Hoeffelman | 220/67 |
| 2,694,534 | 11/1954 | Stingle et al. | 242/68.5 |

FOREIGN PATENTS

| 1,214,626 | 11/1959 | France | 220/72 |
| 1,297,891 | 5/1962 | France | 220/67 |
| 1,334,878 | 7/1963 | France | 220/67 |
| 573,737 | 12/1945 | Great Britain | 220/Plastic |

Primary Examiner—Joseph R. Leclair
Assistant Examiner—James R. Garrett
Attorney—Richard W. Carpenter ABSTRACT: A container is formed from plastic and comprises a hollow, open ended, tubular body having a main portion and a terminal portion. A separate closure is formed having a peripheral flange. The closure engages and closes the open end of the body. The peripheral flange is joined to the terminal portion of the body thereby securing the closure to the body. The method of forming the above container includes the steps of extruding a hollow, open ended tubular body, reshaping a terminal portion of the body, and molding a separate closure having a peripheral flange. The closure is placed in engagement with the open end of the body thereby closing the same. The peripheral flange is bent so as to bring it into engagement with the terminal portion of the body, the flange being joined to the terminal portion to secure the closure to the body.

Patented Dec. 1, 1970 3,543,963

INVENTORS.
JEROME S. HEISLER
ANTHONY J. STARR
JOHN D. CAREY, SR.
BY Richard W Carpenter
ATTORNEY.

Patented Dec. 1, 1970   3,543,963

INVENTORS.
JEROME S. HEISLER
ANTHONY J. STARR
JOHN D. CAREY, SR.
BY Richard W. Carpenter
ATTORNEY

3,543,963

PLASTIC CONTAINER AND A METHOD OF MAKING SAME

BACKGROUND OF THE INVENTION

1. Field of the Invention

This invention relates to a container made from plastic and to a method for making the same and, more particularly, to a container having extruded plastic body joined to molded end closures, and to the method of forming such a container.

2. The Prior Art

Heretofore, plastic containers of the type described herein, had been formed by blow molding, usually in a mold having two mating halves. The container body was integrally formed with the closures, both the body and the closures being formed of indentical plastic. This method of forming has a serious disadvantage since a different mold is required for a container of every size. When a variety of containers of different heights or lengths is to be manufactured, the provision of different molds becomes an expensive and time-consuming operation. Further, blow molded containers, having integrally formed closures, when stored or shipped empty, occupy an undesirable amount of space since they cannot be stacked on top of one another due to their weak columnar strength. Such containers may collapse under relatively small weight. Thus, generally, plastic blow molded containers manufactured heretofore have had inadequate columnar, or vertical, strength and, therefore, could not have been employed to a full extent in the industry. Plastic cans or drums could not be stacked as high as their fiber or metal counterparts which have a substantially higher overall strength.

SUMMARY OF THE INVENTION

The present invention overcomes the disadvantages of the prior art and provides a novel plastic container and a method for making the same. Generally, a tube of plastic of desired length is extruded to form a body of the container. Separate closures for the body are molded from plastic. Flanges, or the like, may be formed in the terminal portions of the body. The separately molded closures are then affixed to close the open ends of the body, while the flange formed on the closure may be worked to conform it to a desired shape so that it can be joined to a portion of the body thereby securing the entire closure thereto.

There are numerous advantages the container and the method of the present invention have over the prior art. For example, tubular plastic bodies can be produced by extrusion at continuous high speed at minimum cost. The molded closures, complete with fine tolerance details can also be produced in volume and economically. The length of the extruded body may be varied as desired. Tooling and die profile changes permit the creation of rectangular, cylindrical, cubic, octagonal or other design variations on the same basic production equipment. The multiple folds of the plastic, welded seams, flanges, or the like, selectively place a desired amount of plastic exactly where the most strength is required. Fine control of material use in also possible, directly influencing performance requirements of the finished product with attendant control of costs. Further, the total concept lends itself to automation.

The present invention provides means for manufacturing "knockdown" containers at one central location and distributing them to strategic marketing locations for assembly This is a vital consideration in the overall economic view. Freight premiums for bulky, empty containers shipped and stored, are of major consideration. Thus, the fact that the container of the present invention can be shipped in a disassembled form and finally assembled at the user's plant, is of great importance. Also, the method of the present invention permits immediate utilization of new and improved resins, composites and structural combinations. Multistrata laminates, for examples, will increase the scope of application of the container of the present invention in the field in which such container is to be used.

DRAWINGS

Figure 4:
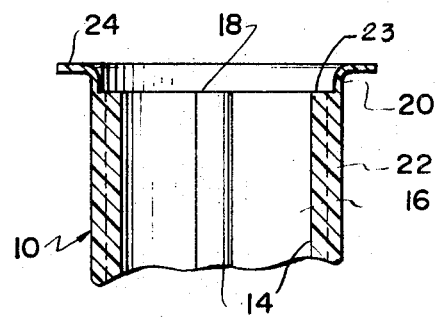
FIG. 4 is sectional view illustrating formation of a flange on the terminal portion of the container body.
Figure 5:
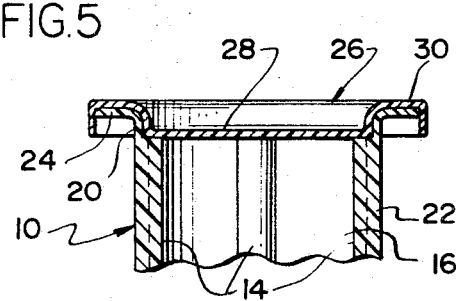
Figure 6:
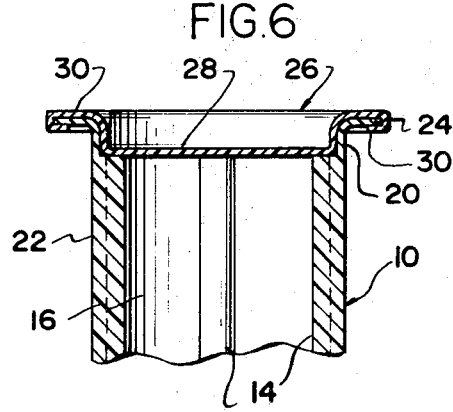
Figure 7:
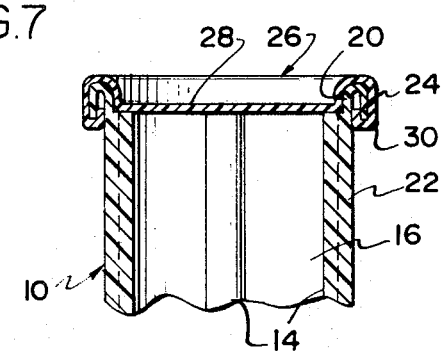
Figure 8:
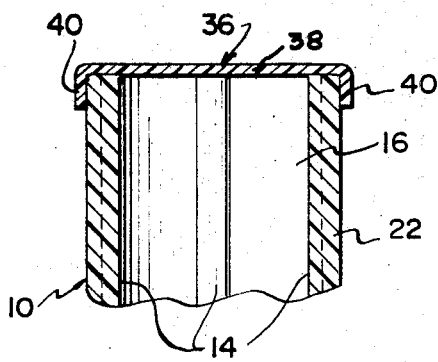
Figure 9:
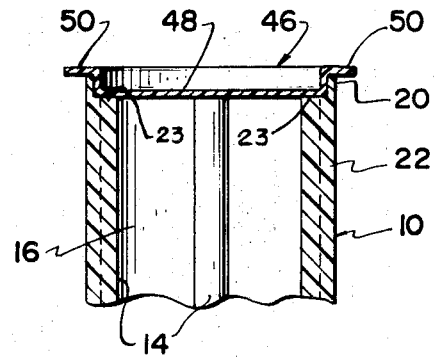
Figure 10:
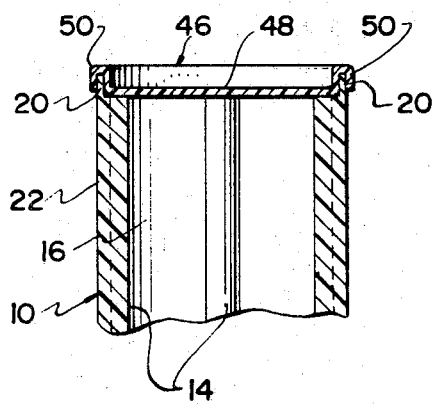
Figure 11:
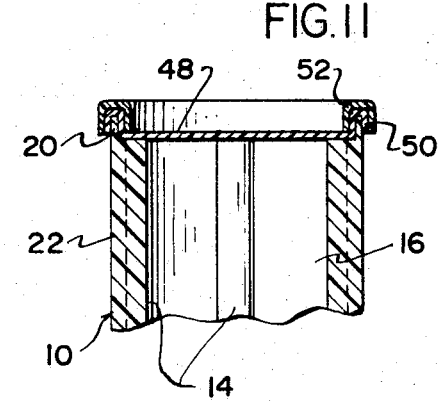
Figure 12:
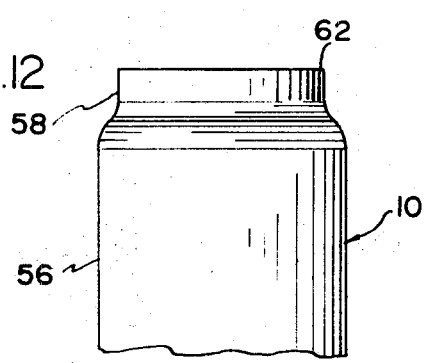
Figure 13:
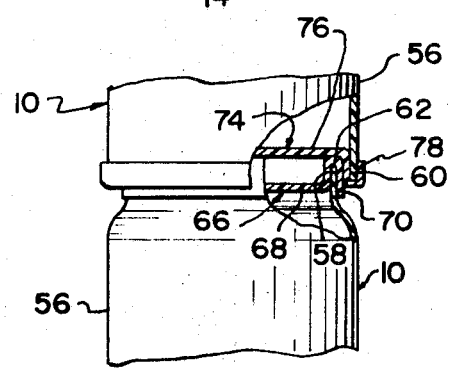

FIGS. 5—7 illustrate attachment of a closure to the container body;

FIG. 8 is a sectional view of another embodiment of the present invention;

FIGS. 9 and 10 are sectional views of the container body and closure, similar to FIG. 4, but representing still another embodiment of the present invention;

FIG. 11 is a sectional view of the container body, closure, and a ring clamped over the closure; and FIGS. 12 and 13 are views of the container representing a further embodiment of the present invention.

While this invention is susceptible of embodiment in many different forms, there are shown in the drawings and will herein be described in detail, embodiments of the invention with the understanding that the present disclosure is to be considered as an exemplification of the principles of the invention and is not intended to limit the invention to the embodiments illustrated. The scope of the invention will be pointed out in the appended claims.

Figure 1:
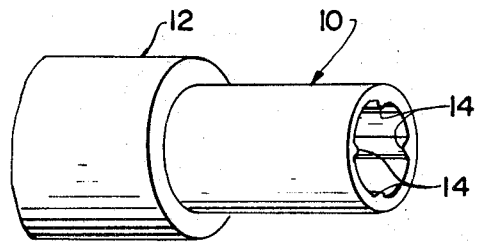
FIG. 1 is a perspective view of a container body being extruded, showing only a portion of the extruder.
Figure 2:
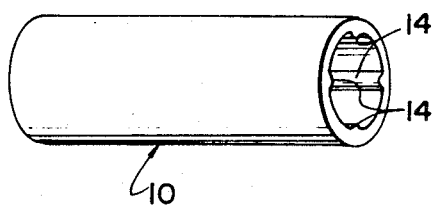
FIG. 2 is a perspective view of an extruded container body.

Referring now to the drawings, more specifically to FIGS. 1 and 2, there is shown an integrally formed, hollow, open ended, tubular container body, generally designated 10, formed form plastic by extruding the same through an extruder 12. The container body 10 can be extruded continuously and then cut to the desired length. The body may have a variety of cross sections formed with corrugations, angular projections, or with selectively thickened or otherwise defined variations from the symmetrical tubular cross section. The container body illustrated herein, is cylindrical in shape and has a plurality of interior reinforcing ribs 14 integrally formed therewith. It is to be noted that the ribs 14 are formed parallel to the longitudinal axis of the body 10. Because of this formation, the ribs will serve as reinforcing elements increasing the columnar strength of the container and thereby substantially eliminating crumpling or collapsing thereof. This feature is extremely valuable in providing stacking strength to the containers, since such containers may be stacked in warehouses or during shipment.

Figure 3:
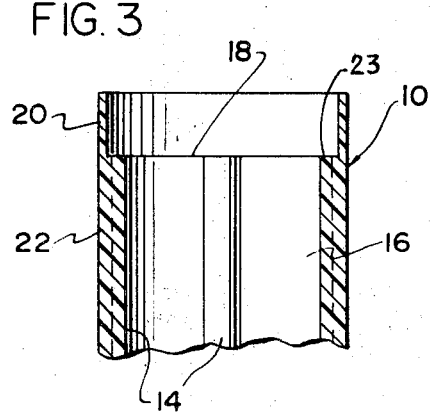
FIG. 3 is a sectional view of the container body shown in FIG. 2 illustrating reduced wall thickness in the terminal portion of the body.

As best seen in FIG. 3, the body 10 has a main portion 16 and a terminal portion 18 located immediately adjacent an open end of the body. While the FIGS. 3 through 11 illustrate one terminal portion 18 of the body, it is to be understood that the body may have another identical terminal portion at the opposite end. A detailed description relating to only one terminal portion will be given herein. Still referring to FIG. 3, the terminal portion 18 has a wall 20 of reduced thickness as compared with the wall 22 of the main portion 16. In the method of manufacture, the reduction of the thickness of the wall 20, is accomplished by reaming, or the like, thereby providing a smooth interior surface of the terminal portion 18. A shoulder 23 is presented between the terminal portion 18 and the main portion 16.

Referring now to FIG. 4, it will be seen that the terminal portion 18 has an outwardly extending flange 24, the formation of the flange being accomplished by reforming of the terminal portion 18 by heat and pressure. A separate end member, or closure 26, formed from moldable plastic, or the like, has a central segment 28 which, as best seen in FIGS. 5—7, is telescopically received within the terminal portion 18 to engage the shoulder 23. A peripheral flange 30 extends outwardly from the central segment 28 of the closure 26.

As best shown in FIGS. 5—7, a portion of the peripheral flange 30 is placed in registry with the outwardly extending flange 24, the remaining portion of the peripheral flange 30 being folded about the flange 24. During completion of the container, the flange 24 and the peripheral flange 30 are folded downwardly into contact with the exterior wall of the body 10 at the terminal portion 18. The flanges 24 and 30 may be seamed by heat and pressure and simultaneously rolled, compressed and reshaped to create a tight band around the end circumference of the body 10.

Referring now to another embodiment of the present invention shown in FIG. 8, there is shown a body 10, identical to the body heretofore described. Here, however, the main portion 16 and the terminal portion 18 have walls of identical thickness. The body is formed by extrusion, as shown in FIG. 1. A separate, substantially flat or disk-like closure 36 having a central segment 38 and a peripheral flange 40 is affixed to the terminal portion 18 and over the end of the body 10. The peripheral flange 40 is bent into a contacting relationship with the exterior wall of the body and may be fused to the body by application of heat. In the exemplary embodiment illustrated, where the body has a cylindrical shape, the closure 36 may be spin welded to the body 10, utilizing techniques well known in the art. In case of rectangular or other shapes which cannot be spin welded, the closure may be joined to the body by heat and pressure utilizing known techniques. Such techniques include ultrasonic welding, heat bonding by the application of heated plates, or joining of the parts by preheating the surfaces to be joined in order to effect fusion.

FIGS. 9 through 11 illustrate still another embodiment of the present invention. Here, the body 10, identical to the body 10 shown in FIG. 2, has a main body portion 16 and a terminal portion 18. The terminal portion 18 has a wall 20 which is of lesser thickness than the wall 22 of the main portion 16. Again, the reduction in wall thickness can be accomplished by reaming, or the like. Unlike the embodiment illustrated in FIGS. 3—7, there is no flange formed on the terminal portion 18 of the body. A shoulder 23 is presented between the main portion 16 and the terminal portion 18.

A closure 46, similar to the closure 26 heretofore described, is separately formed as described heretofore and joined to the body 10. The closure has a central segment 48 and a peripheral flange 50 extending outwardly from the central segment. The central segment is telescopically received within the terminal portion 18 of the body 10 so that the downwardly extending wall of the central segment 48 is in contact with the smooth interior wall of the terminal portion 18 and in engagement with the shoulder 23. The flange 50 is bent about the wall 20 of the terminal portion 18. Thereafter, a channel-grooved ring 52, sized to fit over the bent flange 50, is affixed to the container. In bending the flange 50, the flange is actually reshaped by heat and pressure to intimately conform around the wall 20. The flange and the wall may be permanently held in place by fusion thereof. The fusion may be accomplished by heat or by spin welding. Following the application of the ring 52, the ring is mechanically crimped in a manner which best suits the application. The grooved ring must be formed from a plastic material capable of being cold worked and possessing sufficient properties to function adequately as a permanent joining member. Acetal resin is a plastic well suited for the above use. The attachment of the ring completes the container providing great mechanical integrity to the joint area. The characteristic of acetal plastics to be susceptible to cold pressing or crimping with high mechanical integrity is not shared by any of the other well-known engineering plastics to the same degree. The elasticity, cold flow (creep- or stress-relaxation under load), and low deformation values commonly found in most plastics, rule them out as reliable, long term compression members. The peculiar characteristic of acetal plastics provides the means for mechanically crimping a plastic assembly member or for superimposing the same on a primary weld joint for added mechanical strength.

Referring now to FIGS. 12 and 13, there is shown a further embodiment of the present invention.

A container body 10, formed by extrusion, as heretofore described in connection with the description of FIG. 1, has a uniform cross section. The body has a main portion 56, an upper terminal portion 58 and a lower terminal portion 60. Following the extrusion of the body 10, the terminal portion 58 thereof may be reshaped to have a diameter differing from that of the main portion 56. The diameter of the terminal portion 58 can be enlarged or decreased as desired. After reshaping, a closure may be affixed to the terminal portion in the manner heretofore described in connection with prior embodiments of this invention.

A closure, such as closure 66, has a central segment 68 and a peripheral flange 70 extending outwardly therefrom. In the embodiment illustrated, the terminal portion 58 is formed with an upstanding edge 62. The central segment 68 engages the terminal portion 58 and closes the open end of the container while the flange 70 is joined to the edge 62 of the terminal portion.

The lower terminal portion 60 may retain its original diameter equal to the diameter of the main portion and may be provided with a flanged closure 74, similar to closures 26, 36 or 46, heretofore described. The bottom closure 74 has a central segment 76 which may be recessed so that, when containers are stacked one on top of the other, the closure 74 will telescope over the closure 66 of the container positioned immediately below. By this arrangement stable columns of containers may be successfully stacked.

The variations in diameters in the terminal portions of the body 10, can be accomplished by reshaping the terminal portion 58 on matched forming rolls or the like. Depending on the plastic used, this may be performed by cold-working or by heating the terminal portion, or the rolls, or both. The completed container will have the desired features for efficient use including well-defined, telescopically fitting, stacking means.

We claim:
1. A container formed from plastic, comprising:
a. a hollow tubular body of constant outside diameter and having a main portion and a terminal portion;
b. the terminal portion having a lesser wall thickness than said main portion thereby forming a continuous shoulder between the terminal portion and the main portion in the interior of said body;
c. said terminal portion being bent outwardly into an inverted U configuration to form a flange lying outwardly of said body;
d. a separate closure having a relatively large central portion telescopically received within said body in contacting relationship with said shoulder to close the end of the body, and a relatively short, downwardly oriented peripheral flange surrounding and spaced from said central portion;
e. said peripheral flange being joined to said outwardly extending flange formed from said terminal portion of said body to secure the closure to the body; and
f. said body having interior, integrally formed reinforcing ribs extending the entire length of said body for improving the stacking strength of the container.